United States Patent [19]

Brown

[11] Patent Number: 4,494,144
[45] Date of Patent: Jan. 15, 1985

[54] REDUCED BANDWIDTH VIDEO TRANSMISSION

[75] Inventor: Earl F. Brown, Piscataway, N.J.

[73] Assignee: AT&T Bell Laboratories, Murray Hill, N.J.

[21] Appl. No.: 392,745

[22] Filed: Jun. 28, 1982

[51] Int. Cl.³ .............................................. H04H 7/12
[52] U.S. Cl. .................................... 358/133; 358/105; 358/85; 179/2 TV; 382/9
[58] Field of Search ......................... 358/85, 133, 105; 179/2 TV, 18 SC; 381/53; 382/9

[56] References Cited

U.S. PATENT DOCUMENTS

| | | | |
|---|---|---|---|
| 3,601,530 | 8/1971 | Edson | 178/5.6 |
| 3,980,830 | 9/1976 | Wendland et al. | 358/133 |
| 3,982,063 | 9/1976 | Brown et al. | 178/6 |
| 4,004,084 | 1/1977 | Brown et al. | 358/133 |
| 4,346,405 | 8/1982 | Yoda et al. | 382/9 |
| 4,405,943 | 9/1983 | Kanaly | 358/133 |

OTHER PUBLICATIONS

Higginbotham, A. L., et al., Teleconference Systems, IBM Tech. Disclosure Bulletin, vol. 22, No. 9, 2-80, (Ch) 179-2TV.

Seyler, A. J., "The APO TV-Conferencing Facility", 1973, TJA, vol. 23, No. 3, pp. 216-225.

van Buul, M. C. W., et al., "Standards Conversion of a TV Signal with 625 Lines into a Videophone Signal with 313 Lines", 1973, Philips Research Report 28, pp. 377-390.

Primary Examiner—Howard W. Britton
Assistant Examiner—Edward L. Coles
Attorney, Agent, or Firm—H. T. Brendzel

[57] ABSTRACT

A bandwidth reduced teleconferencing system achieving good video presence. The bandwidth reduction is accomplished by dividing the video picture of the camera into segments, by determining the activity level within each segment and by transmitting the signal of each segment with a resolution level which is related to the activity level within the segment. The most active segment is transmitted at highest resolution while other segments are transmitted at lower resolutions.

12 Claims, 6 Drawing Figures

REDUCED BANDWIDTH VIDEO TRANSMISSION

BACKGROUND OF THE INVENTION

1. Field of the Invention

This invention relates to video signal transmission. Particular application is found for this invention in video conference arrangements which connect groups of conferees in a manner that approaches true face-to-face conference situations.

2. Description of the Prior Art

Typical video conference situations involve two or more locations and more than one person in at least one of the locations. To date, such video conference systems have been employing more than one monitor to display the signals of the various locations. Sometimes more than one camera is used within a location when many people are present (with a corresponding increase in the number of monitors). A drawback of such arrangements is the large cumulative bandwidth required for transmitting the various video signals. Consequently, a number of techniques have been developed to reduce the necessary bandwidth.

One such technique, known as temporal resolution, simply transmits the signal of only one camera at a time. Conventionally, the conferee who is speaking loudest is electronically selected and his picture is transmitted to the other conferees. As different people in the group speak, the appropriate camera is selectively enabled and the new speakers' signal is transmitted. One such system is described by R. C. Edson et al., in U.S. Pat. No. 3,601,530, issued Aug. 24, 1971. The drawback of this system is that it transmits only one person at at time, neglecting all other conferees; providing less than optimum video presence. The conferees do not get the feeling that they are present at a conference, because only one of them is visible at any one time. The movement, speech, and other nonverbal information of other conferees are lost.

Another technique, called spatial reduction, reduces the information content of the video signal of each camera by discarding a portion of the picture being sent. One such system is described in a publication by A. J. Seyler et al., "the APO TV-Conferencing Facility," *Telecommunications Journal of Australia*, Volume 23, No. 3, 1973, pp. 216-225. That system attains a bandwidth reduction by accepting one half of the video picture of two cameras and combining the two half pictures into one video signal. While that system improves video presence and reduces bandwidth, unacceptable picture quality may result as the number of TV cameras, or the number of people per camera increases.

Yet another technique for reducing bandwidth, which may be called time stretching, also reduces the information content of the video signals. One embodiment of this technique is described by van Buul et al., in *Philips Research Reports*, Volume 28, August 1973, pp. 377-390. In accordance with this technique, only odd-numbered scanning lines are transmitted and, within the monitor, the odd-numbered lines are placed in a pair of analog shift registers. The shift registers are read out seriatim, providing thereby the required number of scan lines. This technique achieves bandwidth reduction but results in a certain degree of picture degradation.

Still another technique for reducing bandwidth, called conditional replenishment, transmits for each frame only the signals that correspond to changes in the picture from the previous frame. This, of course, requires the monitors to have memory to refresh the screen and to replenish the received picture changes. One system employing this technique is described, for example, in U.S. Pat. No. 3,609,244, titled "Conditional Replenishment Video System with Variable Length Address Code", issued to F. W. Mounts on Sept. 28, 1971.

The above techniques are not mutually exclusive and, indeed, some have been combined in the prior art. For instance, in my U.S. Pat. No. 4,004,084, issued Jan. 18, 1979, my colleagues and I have disclosed a system employing temporal and spatial resolution reduction. Therein, a picture from one or more of the cameras is automatically adapted to a speech level control signal or to a motion detector signal so as to advantageously interleave and give priority to a picture from one camera over the pictures from other cameras. The spatial reduction of each picture is realized by transmitting and displaying less than the total picture.

Recently, a new video camera was introduced which develops 500 scan lines for each frame and resolves 1500 pels in each line. This camera has about six times the horizontal resolution of conventional cameras but, correspondingly, it requires about six times the bandwidth of conventional cameras. The prior art bandwidth reduction techniques are inappropriate for this camera because they depend either on the comparison of the signals of separate cameras and/or they degrade the entire video signal of non-selected cameras.

It is an objective of this invention to realize a teleconferencing arrangement with improved video presence and with reduced bandwidth which could advantageously be used with conventional video cameras and with the high resolution video cameras.

SUMMARY OF THE INVENTION

This and other objects of the invention are achieved by dividing the video picture of the camera into segments, by determining the activity level within each segment and by transmitting the signal of each segment with a resolution level which is related to the activity level within the segment. That is, the most active segment is transmitted at highest resolution while other segments are transmitted at lower resolutions. More than two levels of resolution can be employed, and the activity indicia may be voice or movement within the segments, or both. In the context of this invention, the concept of a lower resolution includes the concepts of sub-sampling and coarser than normal quantization. It is contemplated, for example, that coarse/fine quantization decisions could be used in a conditional replenishment system employing the principles of this invention.

DETAILED DESCRIPTION

In order to achieve good video presence in a teleconference situation, one must endeavor to give the viewers as much video and audio information as possible.

The audio information poses minimal problems because it is inherently of low bandwidth. Also, audio signals can be combined, and spatial resolution of such signals is not critical. For instance, two loudspeakers are sufficient to permit listeners to perceive the direction from which sound comes.

Not so with video signals, which require a large bandwidth and which can not be combined with other video signals. Yet, in the case of video information it has been observed that viewers inherently tend to look at those portions of a video picture which are changing (i.e., contain movement) and that viewers also tend to look at the person who is speaking rather than at those who are silent. These factors are used to an advantage in my invention to reduce the bandwidth of video signals.

By way of illustration, the embodiment described below comprises a system that is sound sensitive.

Figure 1:
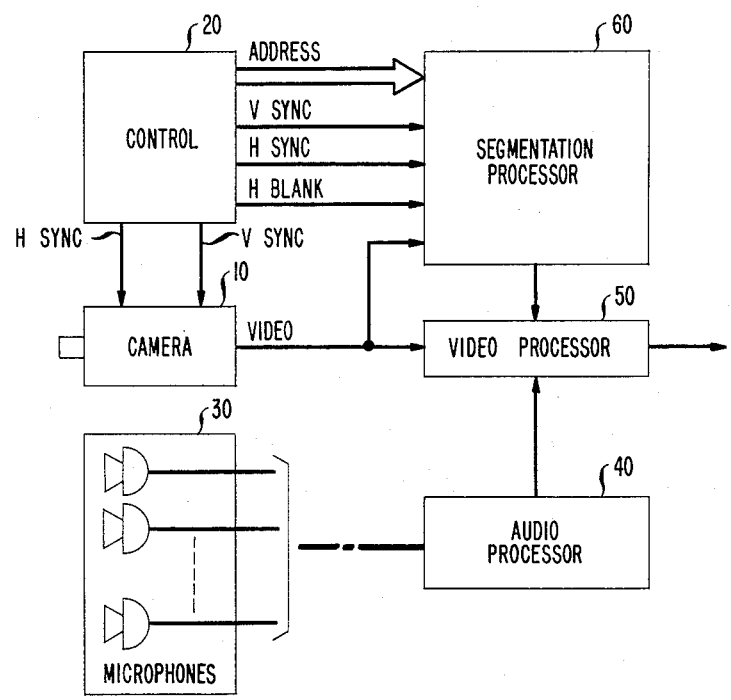
FIG. 1 is a block diagram of an embodiment of this invention.

FIG. 1 depicts in block diagram form one embodiment of my invention. Camera 10 is a video camera that develops 500 lines and 1500 pels per line. It is controlled by control block 20 which provides to camera 10 the necessary vertical and horizontal synchronization signals. It may be noted, in passing, that camera 10 can be a conventional video camera. Microphone arrangement 30 includes a plurality of microphones that provide signals to audio processor 40. Processor 40 determines which microphone has the loudest signal and communicates that information to video processor 50. Camera 10 applies its video output signal to video processor 50 and to segmentation processor 60. Segmentation processor 60, under direction of control block 20, implements the division of the video picture into segments and imparts this information to video processor 50. Processor 50 develops a modified video signal to provide the highest resolution for the most active segment and lower resolution for all other segments.

Figure 2:
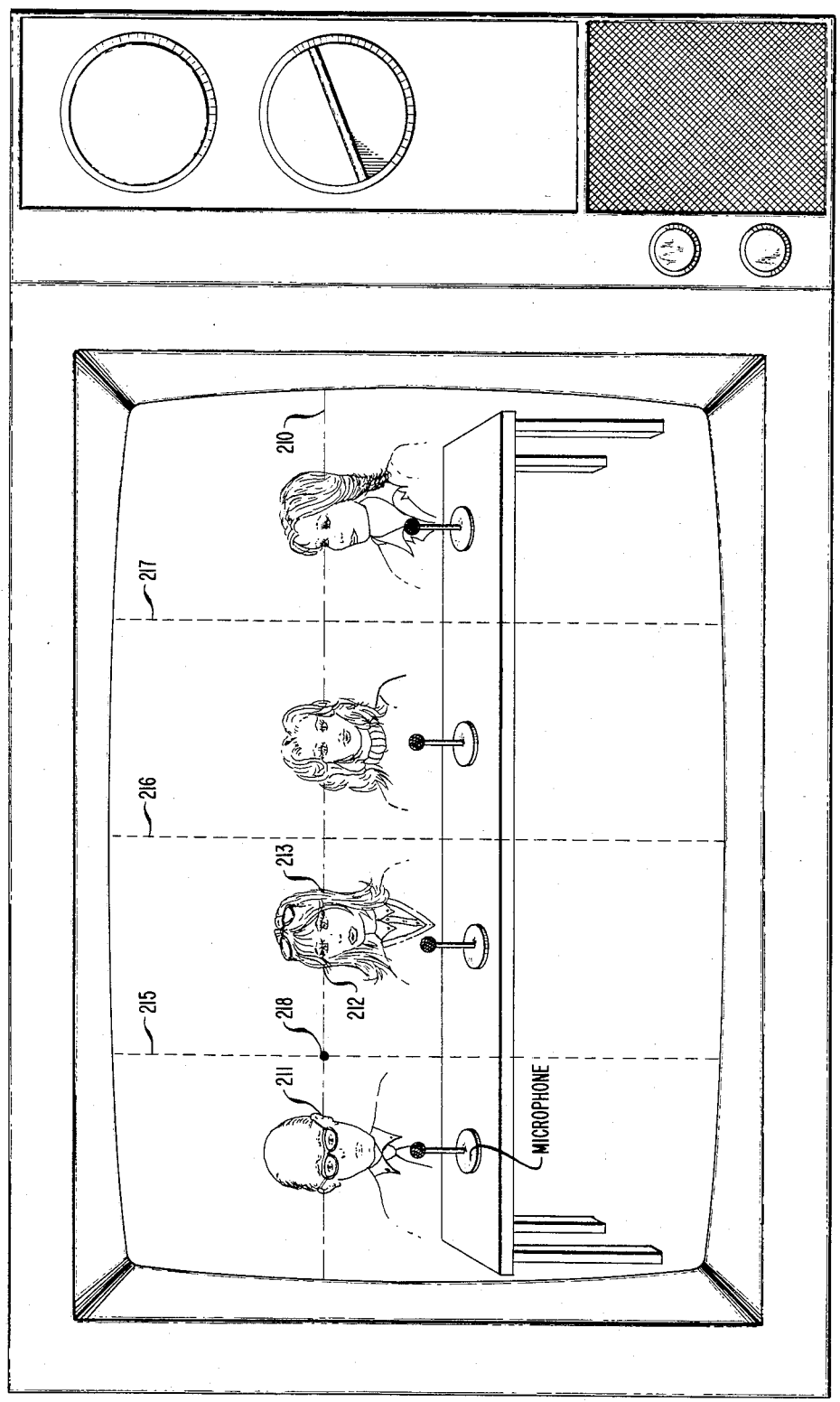
FIG. 2 is a pictorial illustration of a typical conference arrangement.

FIG. 2 is presented to assist in understanding the operation of the system of FIG. 1. FIG. 2 pictorially illustrates a common teleconferencing arrangement with four people seated at a table. In front of each person is a microphone which can be turned on at the beginning of the conference. In back of the conferees is a back-drop of a background color on which the system of FIG. 1 can "key". Line 210 represents one scan line of the image. It traverses through background color and through nonbackground color intervals, as indicated by the interval between points 211 and 212 and the interval between points 212 and 213. Lines 215, 216 and 217 are the segment boundaries.

Figure 3:
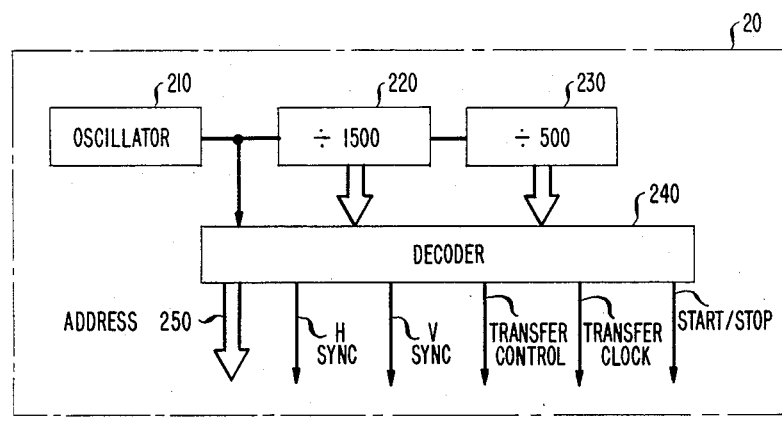
FIG. 3 is a detailed block diagram of the control block in FIG. 1.

FIG. 3 depicts control block 20. Therein, oscillator 210 provides the basic 4.2 MHz clock signal that is applied to a "divide by 1500" counter 220. The output signal of counter 220, which switches at the horizontal synchronization rate, is applied to a "divide by 500" counter 230 which, in turn, develops the frame rate. The clock signal and the output signals of counters 220 and 230 are applied to decoder 240 which develops six control signals: a start/stop signal, a transfer clock signal, a transfer control signal, a V-sync signal, an H-sync signal, and address signals.

The address signals, appearing on address bus 250, come directly from counter 220. Since counter 220 generates the horizontal synchronization interval, address bus 250 indicates the position of the scanning beam of camera 10 on each scan line. When the beam is at the beginning of the scan line, the address bus contains the state 0. When the beam is at the end of the scan line, the address bus contains the state 1500.

The H-sync signal is the horizontal synchronization pulse. It is conveniently generated by detecting the state 0 in counter 220.

The V-sync signal is the vertical synchronization pulse and it occurs after each scan of 500 lines. The V-sync signal is obtained with conventional circuitry responsive to counter 230.

The start/stop signal controls the number of scans during which the segment boundaries are computed. The number of scans, conveniently, may be chosen to be a power of 2, e.g., 128 scan lines in the system described. The start/stop signal is developed in decoder 240 with conventional circuitry responsive to counter 230. Most effectively, the 128 lines should be chosen to be somewhere in the middle of the frame, e.g., between scan lines 256 and 384.

Within segmentation processor 60, as will be described hereinafter, there are two memories which store the segment boundaries information. This information must be transferred from one memory to the other and, to this end, a transfer clock signal and a transfer control signal are developed in decoder 240. The transfer clock signal is the basic 4.2 MHz clock signal of oscillator 210, while the transfer control signal is a gating pulse that is equal in length (in terms of transfer clock periods) to the size of the memories in processor 60. The transfer control signal is obtained by appropriate monitoring of counter 220.

The memories in processor 60 store the addresses of the segment boundaries and, therefore, the memory size is controlled by the expected number of segments. Generally, that number is less than 8 so the number of "words" of the memories in processor 60 need not be greater than 8.

Figure 4:
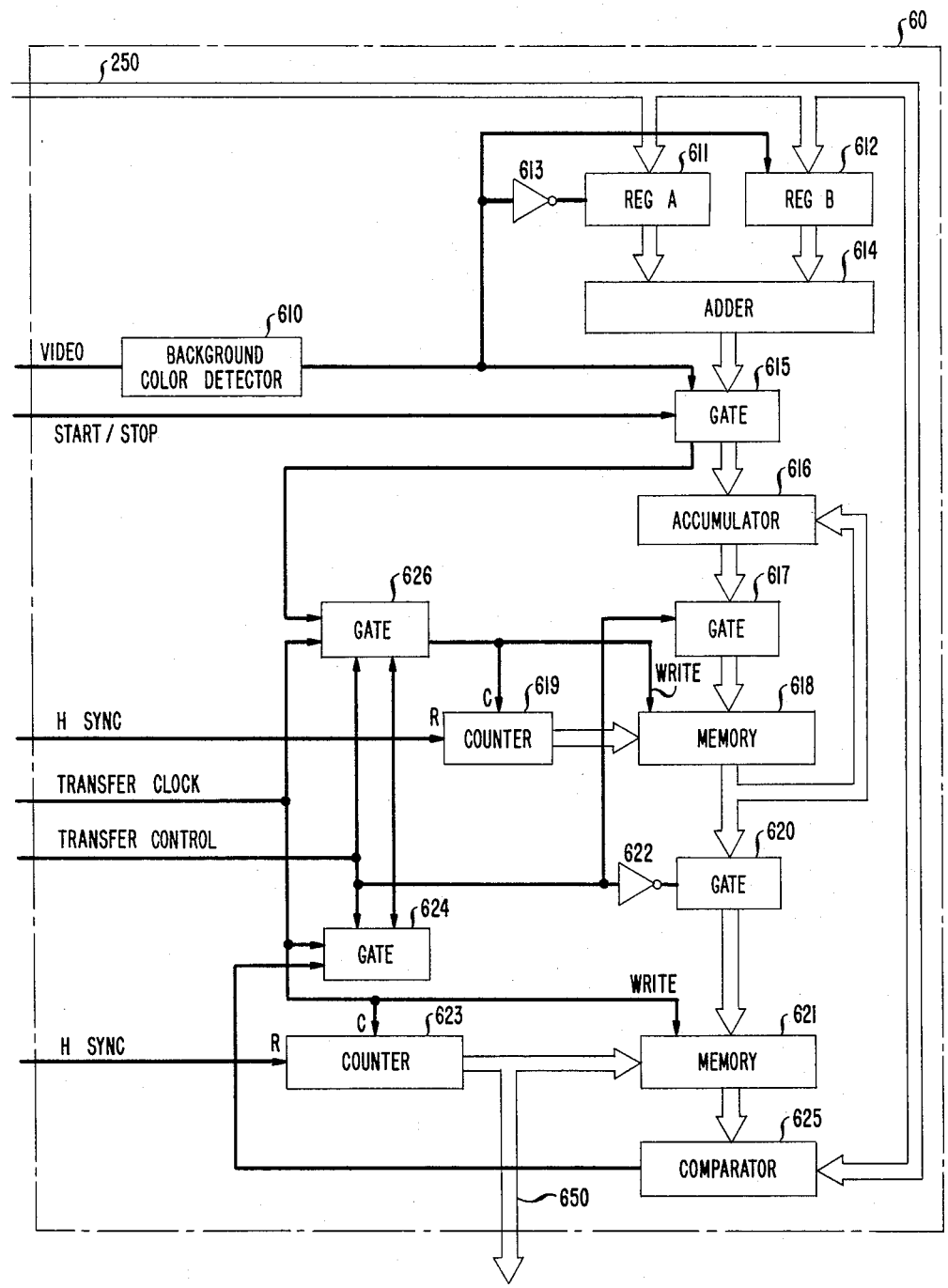
FIG. 4 is a detailed block diagram of the segmentation processor in FIG. 1.

FIG. 4 depicts the details of segmentation processor 60. Background color detector 610 is a conventional "chroma-keying" detector adjusted to respond to the color of the back-drop in FIG. 2. A chroma-keying system is described, for example, by Jun-Ichiro Nakamura and Kunik Atre Kamakura in an article entitled "High Quality Montage Pictures by a New Color Killer Soft Chrome Key System", published in the SMPTE Journal, Vol. 90, No. 2, February 1981, pp. 107–112. As the video camera's scanning beam traverses a scan line, e.g., line 210 in FIG. 2, detector 610 produces a logic level 1 during periods of background color while at other times it produces a logic level 0. Positive transitions thus indicate a switch to background color, while negative transitions indicate a switch from background color.

The output signal of detector 610 is applied to the clock input of register 612 and, through inverter 613, to the clock input of register 611. The input signals to registers 611 and 612 come from address bus 250. Registers 611 and 612 respond to negative clock transitions. Hence, register 611 contains the address where the background color begins and register 612 contains the address where background color ends.

The output signals of registers 611 and 612 are applied to adder 614. At the instant when the output signal of detector 610 goes to 0, for each pair of signals from registers 611 and 612 the output signal of adder 614 represents twice the address of the midpoint between the addresses within registers 611 and 612. That midpoint (218) is the center point of the background color interval that is being scanned by camera 10. For example, when register 611 contains the address of point 211 in FIG. 2 (e.g., address 290) and register 612 contains the address of point 212 (e.g., address 600) then the output signal of adder 614 corresponds to the number 890. That is twice the address 445, which is the midpoint between points 211 and 212.

The output signal of adder 614 is applied to accumulator 616 through gate 615. Gate 615 is controlled by the start/stop signal, permitting an accumulation of 128 scan lines. The output signal of accumulator 616, through gate 617, is applied to memory 618 and the data is written into memory 618 under control of detector 610 (memory 618 writes on negative transitions of the "write" control port). Gate 617 is controlled by the transfer control signal. For purposes of the illustrative embodiment of FIG. 4, memory 618 is an 8 word 20 bits/word memory.

Counter 619 develops the address signals for memory 618. It is normally advanced by the output signal of detector 610 (through gate 615 and gate 626) as soon as the data applied to memory 618 is written. It is reset with the H-sync pulse.

Memory 618 applies its output signal to accumulator 616 and to gate 620. Since counter 619 is reset with the H-sync pulse and since the output signal of memory 618 is applied to accumulator 616, the address information of each background color midpoint, in each scan, is added to the address information of the corresponding midpoint addresses in previous scans, and the sum is stored in memory 618. For example, the address (doubled) of the first midpoint in the scan line 210 (FIG. 2) is added to the sum of the addresses (doubled) of the first midpoints of previous scans and is stored in address 0 of memory 618. At the end of the 128 scans, address 0 in memory 618 contains a number that, when divided by 256, represents the average midpoint address in the 128 scans. This address defines the boundary between segments 1 and 2.

Following the 128 scans, the information in memory 618 can be employed to control video processor 50. To permit utilization of this data during an entire frame, the information within memory 618 is transferred at the end of the frame, through gate 620, to memory 621. Concurrently with the transfer of information to memory 621, memory 618 is erased in preparation of the next frame's computations. The copying from memory 618 into memory 621 is accomplished with the transfer control signal and the transfer clock. The transfer control signal disables gate 617 and, through inverter 622, enables gate 620. Gate 626 transfers control of counter 619 (and the "write" port of memory 618) to the transfer clock signal and it cycles through the addresses of memory 618. Memory 618 is erased by the disabling of gate 617. Counter 623 provides the address information to memory 621 and it also is advanced by the transfer clock signal, which is applied thereto through gate 624. The "write" port of memory 621 is connected to the transfer clock. Gate 624 is controlled by the transfer control signal and counter 623 is reset with the H-sync signal.

The output signal of memory 621, together with the signal on bus 250, is applied to comparator 625. The output signal of comparator 625 is applied to gate 624, thereby advancing counter 623 each time the address at the output of memory 621 equals the address on bus 250. In this manner, in addition to providing the address for memory 621, the state of counter 623 represents the segment number in which the scanning beam of camera 10 resides. For example, FIG. 2 shows four segments (three boundaries) and, assuming the segment boundaries are at addresses 350, 750, and 1100, the following describes the signals of counter 623. With each horizontal scan, counter 623 begins at state 0 and memory 621 presents at its output the state 350. When the signal on bus 250 reaches the state 350, comparator 625 advances counter 623 to state 1 and memory 621 presents at its output the state 750. When the signal on bus 250 reaches the state 750, comparator 625 again advances counter 623 and memory 621 points to the next boundary demarcation, to wit, state 1100. Thus, the state of counter 623 is the useful output of segmentation processor 60, and it is applied to processor 50 via bus 650.

Figure 5:
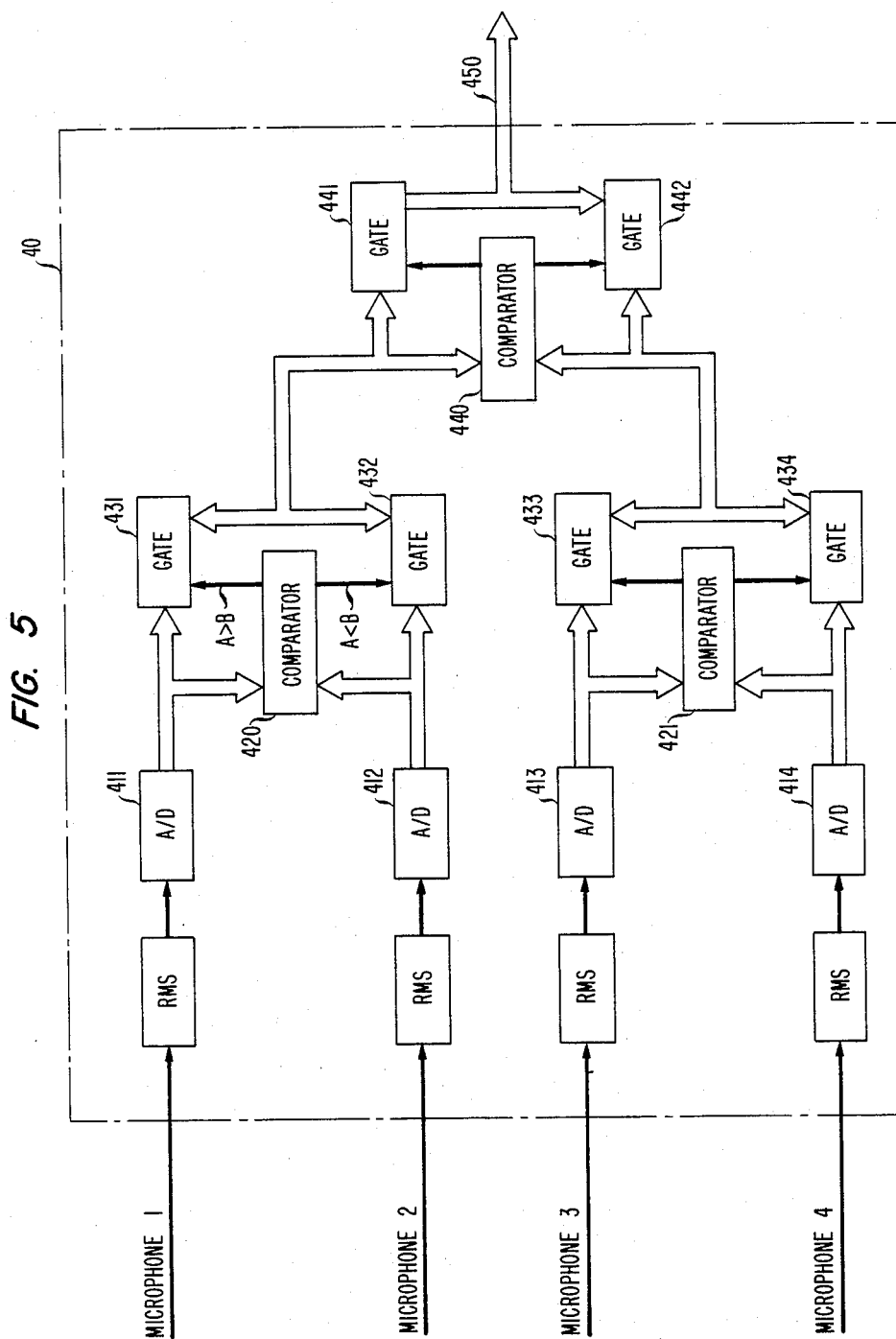
FIG. 5 is a detailed block design of the audio processor in FIG. 1.

FIG. 5 is a detailed block diagram of audio processor 40. It accepts signals from a plurality of microphones and delivers to processor 50 the identity of the microphone having the largest average rms signal. In the drawing of FIG. 5, only four microphones are shown but that number can readily be expanded; with the hardware growing in size in a "binary tree" fashion. Within processor 40, the signal of each microphone is applied to an appropriate rms circuit and the output signal of each rms circuit is applied to a conventional A/D converter. The rms circuit may be a diode rectifier followed by a low-pass filter.

The above operations precondition the microphone signals by digitizing them. The remaining circuitry in processor 40 compares the digitized signals of pairs of microphones, selects the larger signal of each pair and the selected signals are compared successively until a "winner" is determined.

In FIG. 5, microphones 1, 2, 3, and 4 are digitized in converters 411, 412, 413 and 414, respectively. The digitized signals of microphones 1 and 2 are applied to comparator 420, and the digitized signals of microphones 3 and 4 are applied to comparator 421. Concurrently, the digitized signals of microphones 1 through 4 are applied to gates 431 through 434, respectively. Also applied to gates 431 through 434 are hard-wired codes for identifying the microphones. The code for gate 431 is 000, the code for gate 432 is 001, the code for gate 433 is 010 and the code for gate 434 is 011. Comparators 420 and 421 enable the gates which are connected to the larger digitized signal of each pair, permitting the larger digitized signal of each pair to pass through together with the identifying code of the microphones. The output signals of the 431-432 and 433-434 pairs are applied to gates 441 and 442, respectively, and to comparator 440. Again, comparator 440 selects the stronger signal, appropriately enabling either gate 441 or gate 442. This results in an output signal that contains the code of the microphone with the strongest digitized signal, as well as the digitized signal itself. The code of the microphone with the strongest digitized signal is the useful output of processor 40. That code is applied to video processor 50 via bus 450.

Processor 50 manipulates the video signal of camera 10 and prepares it for transmission to the monitors. Since different video picture segments have different resolution levels, each scan line is composed of one or more low resolution intervals and one high resolution interval. The high resolution interval requires a wide bandwidth while the low resolution intervals require a narrower bandwidth. Thus, the first function of processor 50 is to generate these different bandwidth intervals in response to the signals of segmentation processor 60 and audio processor 40. The second function of processor 50 is to prepare a video signal of a constant bandwidth (for transmission to the monitors) that is narrower than the wide bandwidth of the high resolution interval.

Figure 6:
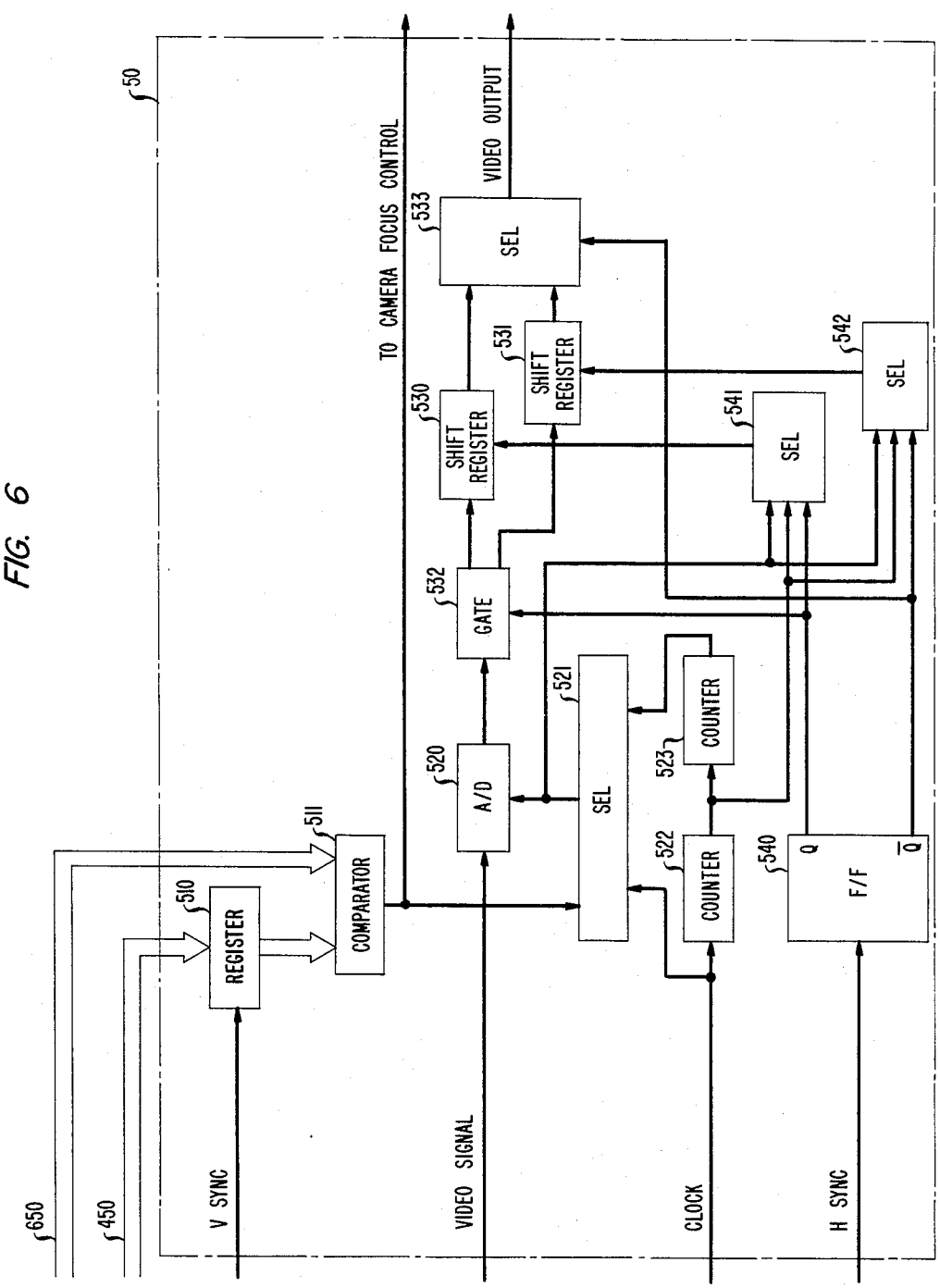
FIG. 6 is a detailed block diagram of the video processor in FIG. 1.

FIG. 6 describes one embodiment of processor 50. Register 510, strobed with the V-sync signal, stores at the beginning of each frame the identity of the microphone which has the strongest digitized signal. This information comes to register 510 via bus 450 (FIG. 5). The output signal of register 510 is compared in comparator 511 to the current segment number presented by counter 623 in FIG. 4 via bus 650. A match between the two signals indicates that the scanning beam of camera 10 is traversing the high resolution segment. The output signal of comparator 511 is used to electronically control the focus of camera 10, thereby affecting the resolution of the camera and, consequently, the bandwidth of the video signal output of camera 10. The output signal of comparator 511 can also be used to control the coarseness of the video signal quantization and other parameters that determine the bandwidth necessary for the video signal.

The video output signal of camera 10 is processed in accordance with the output signal of comparator 511. Specifically, the video signal of camera 10 is digitized in A/D converter 520 under control of a clock signal gated with selector 521. Selector 521 is controlled by the output signal of comparator 511. The clock signal selected is either the basic 4.2 MHz clock or a slower clock, generated by counter 523. Counter 523, is responsive to counter 522 which, in turn, is responsive to the basic 4.2 MHz clock. Counters 523 and 522 are arranged so that the frequency of counter 523 output signal corresponds to the bandwidth of the video signal from camera 10 when it is defocused, and the frequency of the counter 522 output signal corresponds to the reduced bandwidth video signal output of the system of FIG. 1.

The output signal of converter 520 is alternately routed into registers 530 and 531 under control of gate 532. The output signals of shift register 530 and 531 are alternately accessed by selector 533, comprising the output signal of the system of FIG. 1. Registers 530 and 531 allow for the difference in the time scales between the signals derived from converter 520 and the output signal transmitted to the monitors.

To provide for the alternating operations of shift register 530 and 531, gate 532 and selector 533 are made responsive, to the Q and the Q-inverse outputs, respectively, of flip-flop 540 (which is toggled by the H-sync signal). Also, the Q and Q-inverse outputs of flip-flop 540 control selectors 541 and 542, which provide to shift registers 530 and 531 either the clock signal at the output of counter 522 or the clock signal at the output of selector 521.

Although the system of FIG. 1 is responsive to sound and operates with the aid of chroma-keying, it should be realized that the principles of my invention can be applied effectively with different segmentation algorithms and with different focus-defocus algorithms. For example, segmentation may be permanently preset, preset by the operator of camera 10 based on initial image conditions, or computed on the basis of areas of change in the picture. Segment selection may be keyed only on the movement of subjects, to a combination of movement and sound, or may be regularly stepped through each segment at some convenient rate. The "keying on movement" technique may be particularly attractive in conditional replenishment systems. It should also be observed that although the system of FIG. 1 discloses vertical segmentation of the image of camera 10, the principles of my invention are applicable to horizontal segmentations as well.

What is claimed is:

1. A method for modifying the signal of a video camera to reduce the bandwidth of said signal, characterized by the steps of:
    a. dividing the image represented by said video signal into image segments;
    b. choosing at least one of said image segments in accordance with a predetermined attribute associated with each of said image segments and developing thereby selected image segments; and
    c. developing a composite video signal corresponding to a high resolution signal for said selected image segments and a lower resolution signal for remaining ones of said image segments.

2. A method for developing video signals corresponding to an image derived from a video camera, comprising the steps of:
    a. dividing said image into image segments;
    b. choosing at least one of said image segments in accordance with a predetermined attribute associated with each of said image segments and developing thereby selected image segments; and
    c. developing high resolution signals for said selected segments of said image and lower resolution signals for remaining ones of said image segments.

3. The method of claim 2 wherein said step of dividing said image into image segments is dynamically set based on the existing conditions of said image.

4. The method of claim 2 wherein said step of dividing into segments is arranged to have the actively changing regions of said image within a small number of said image segments.

5. The method of claim 2 wherein said step of choosing is responsive to sound emanating from said image segments.

6. A method for reducing the transmission bandwidth of a video camera comprising the steps of:
    a. ascertaining regions of active change in the image transmitted by said video camera;
    b. dividing said image into segments that encompass said regions of active change;
    c. developing high resolution signals for those segments that encompass regions of most active change; and
    d. developing lower resolution signals for remaining segments.

7. Apparatus for reducing the bandwidth of video camera signals comprising:
    means for dividing the image represented by said video signals into segments; and
    means for automatically altering said video signals in accordance with an attribute of said image within said segments to reduce said bandwidth of video camera signals to be transmitted.

8. Apparatus for reducing the signal bandwidth of a video camera comprising:
    a segmentation processor for developing control signals that divide the image by said video camera into image segments, said control signals being developed in accordance with a predetermined attribute of said image segments;

first means for reducing the bandwidth of the output signal of said video camera in response to said segmentation processor; and control means for coordinating the operation of said segmentation processor and said first means.

9. The apparatus of claim 8, wherein said first means comprises second means for deciding which image segments are to be transmitted at high resolution and which image segments are to be transmitted at lower resolution.

10. The apparatus of claim 9, wherein said second means comprises a plurality of microphones and third means, responsive to said plurality of said microphones for ascertaining the identity of the microphone possessing the strongest audio signal.

11. The apparatus of claim 8, further comprising a video camera for applying video signal to said first means.

12. The apparatus of claim 8, wherein said segmentation processor employs chroma-keying for developing said control signal that divides said image into said image segments.

* * * * *